United States Patent [19]

Hug et al.

[11] Patent Number: 4,497,327
[45] Date of Patent: Feb. 5, 1985

[54] COMBINE HARVESTER WITH ANGLED AXIAL THRESHER

[75] Inventors: Franz Hug; Franz Johler, both of Gottmadingen; Reimar Franke, Dillingen, all of Fed. Rep. of Germany

[73] Assignee: Klockner-Humboldt-Deutz AG, Fed. Rep. of Germany

[21] Appl. No.: 413,482

[22] Filed: Aug. 31, 1982

[30] Foreign Application Priority Data

Sep. 4, 1981 [DE] Fed. Rep. of Germany ....... 3135118

[51] Int. Cl.³ .............................................. A01F 12/10
[52] U.S. Cl. ................................ 130/27 T; 130/27 AB; 56/14.6
[58] Field of Search ............. 56/14.6; 130/27 R, 27 H, 130/27 M, 27 T, 27 AB

[56] References Cited

U.S. PATENT DOCUMENTS

| 3,425,423 | 2/1969 | McKenzie | 130/27 T |
|---|---|---|---|
| 4,087,953 | 5/1978 | Wilson et al. | 56/14.6 |
| 4,209,024 | 6/1980 | Powell et al. | 56/14.6 |
| 4,273,138 | 6/1981 | Paulli | 130/27 T |
| 4,338,955 | 7/1982 | Rainere | 130/27 AB |

FOREIGN PATENT DOCUMENTS

| 43355 | 1/1982 | European Pat. Off. | 56/14.6 |
|---|---|---|---|
| 1919399 | 10/1969 | Fed. Rep. of Germany | 56/14.6 |
| 2057240 | 4/1981 | United Kingdom | 130/27 T |

OTHER PUBLICATIONS

Principals of Farming, Caspers, vol. 19, 1969, No. 1, pp. 9–17.

Primary Examiner—Gene Mancene
Assistant Examiner—John G. Weiss
Attorney, Agent, or Firm—Hayes, Davis & Soloway

[57] ABSTRACT

The invention concerns itself with a combine harvester including an axial thresher wherein are disposed a mowing device, an attached conveying system for the cut harvest product and a consecutive threshing drum assembly in the travel direction (45) of the combine harvester. The drum axis (43) of the threshing drum assembly (23, 25) is disposed opposite the travel direction (45) of the combine harvester in the horizontal line at an acute angle (α) so that the drum assembly is situated within the width of the vehicle. By this arrangement there results between the front side of the threshing drum assembly and the conveyor (9) a free space where it is possible to dispose an inserting device (23) that can transfer the harvest product into a tangential inlet (47) at the forward end of the threshing drum asssembly. In this manner there results an easy and smooth transfer of the flow of harvest product delivered by the conveyor into the threshing drum in the tangential direction desired.

35 Claims, 12 Drawing Figures

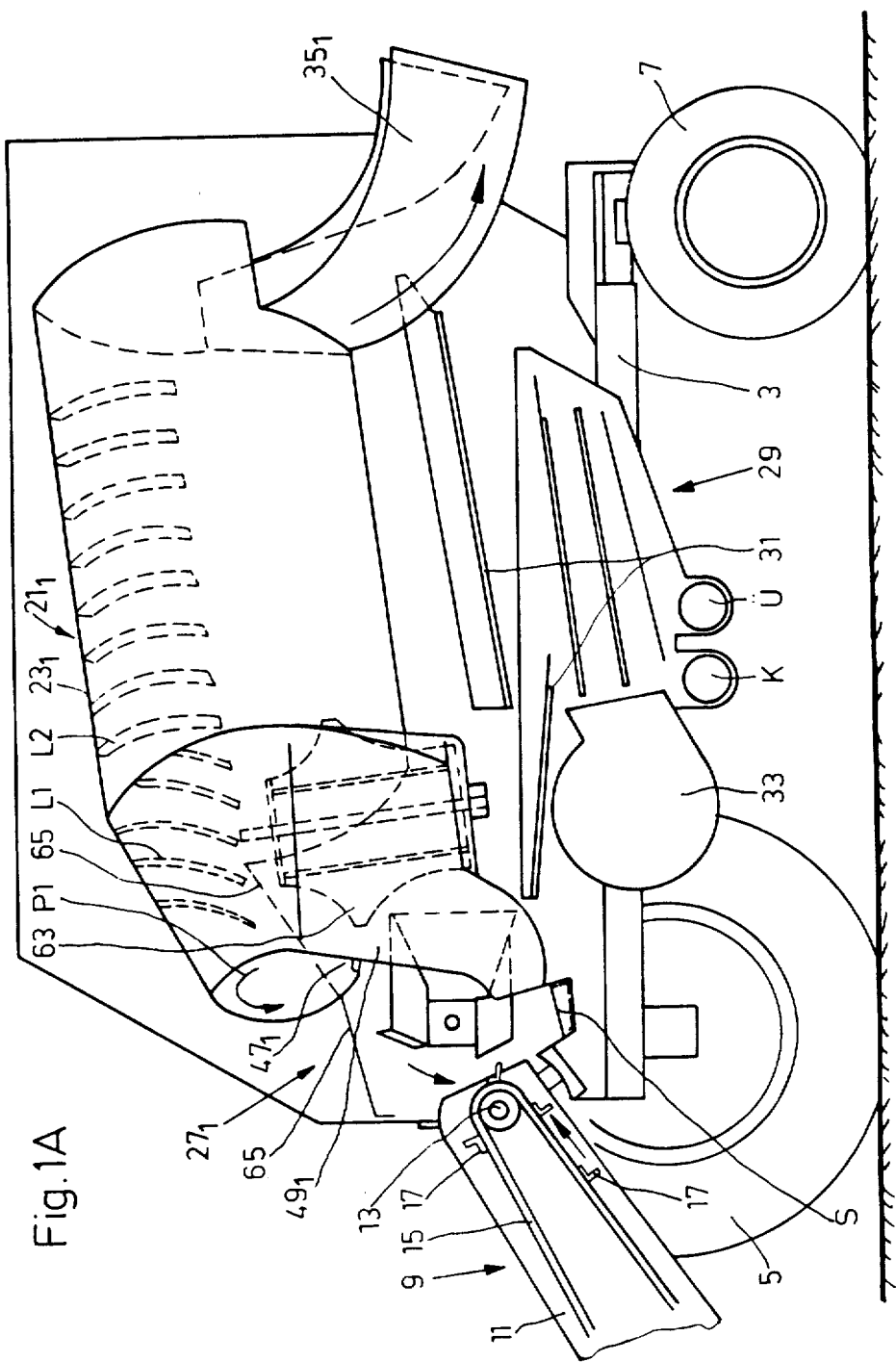

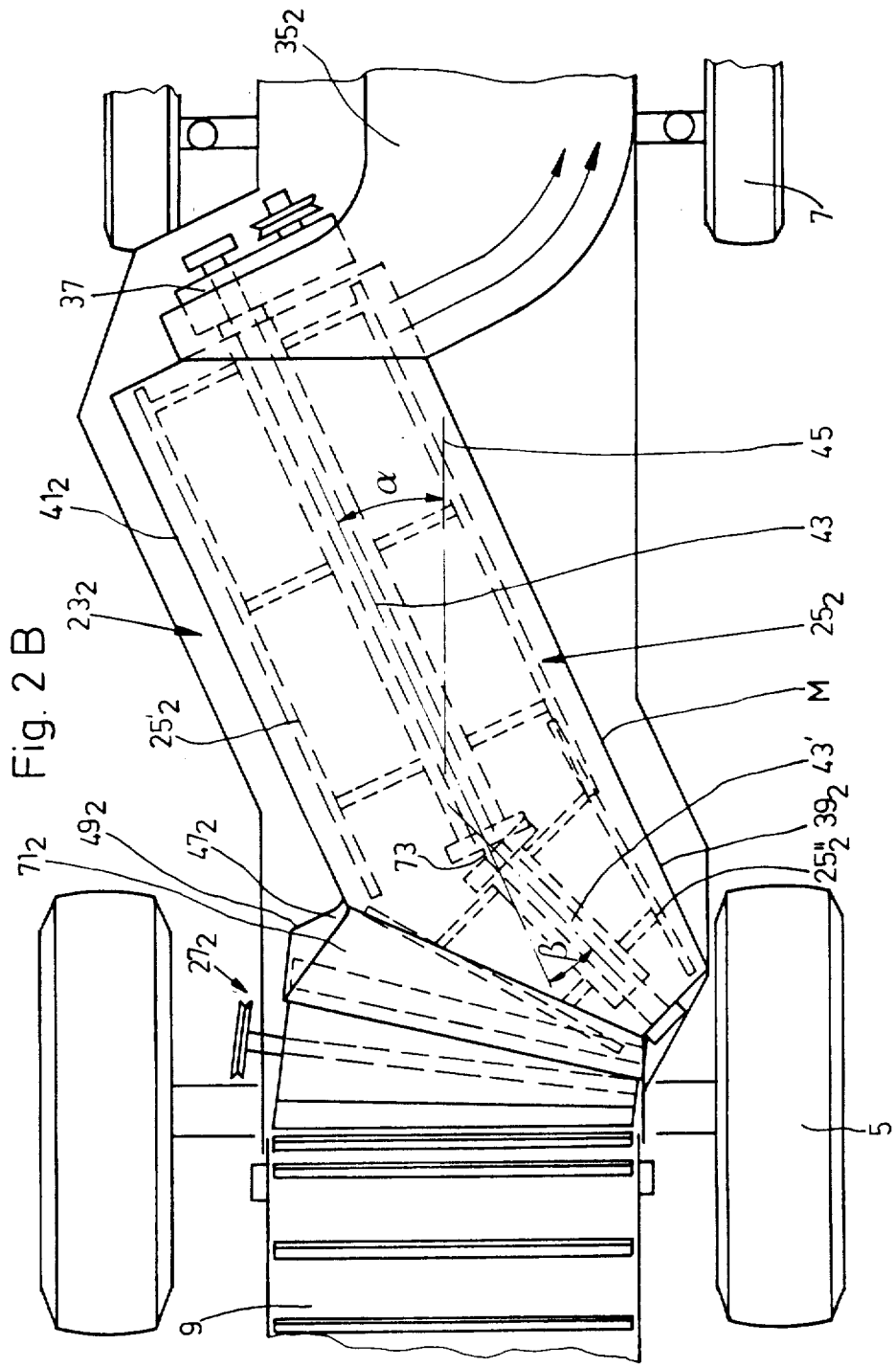

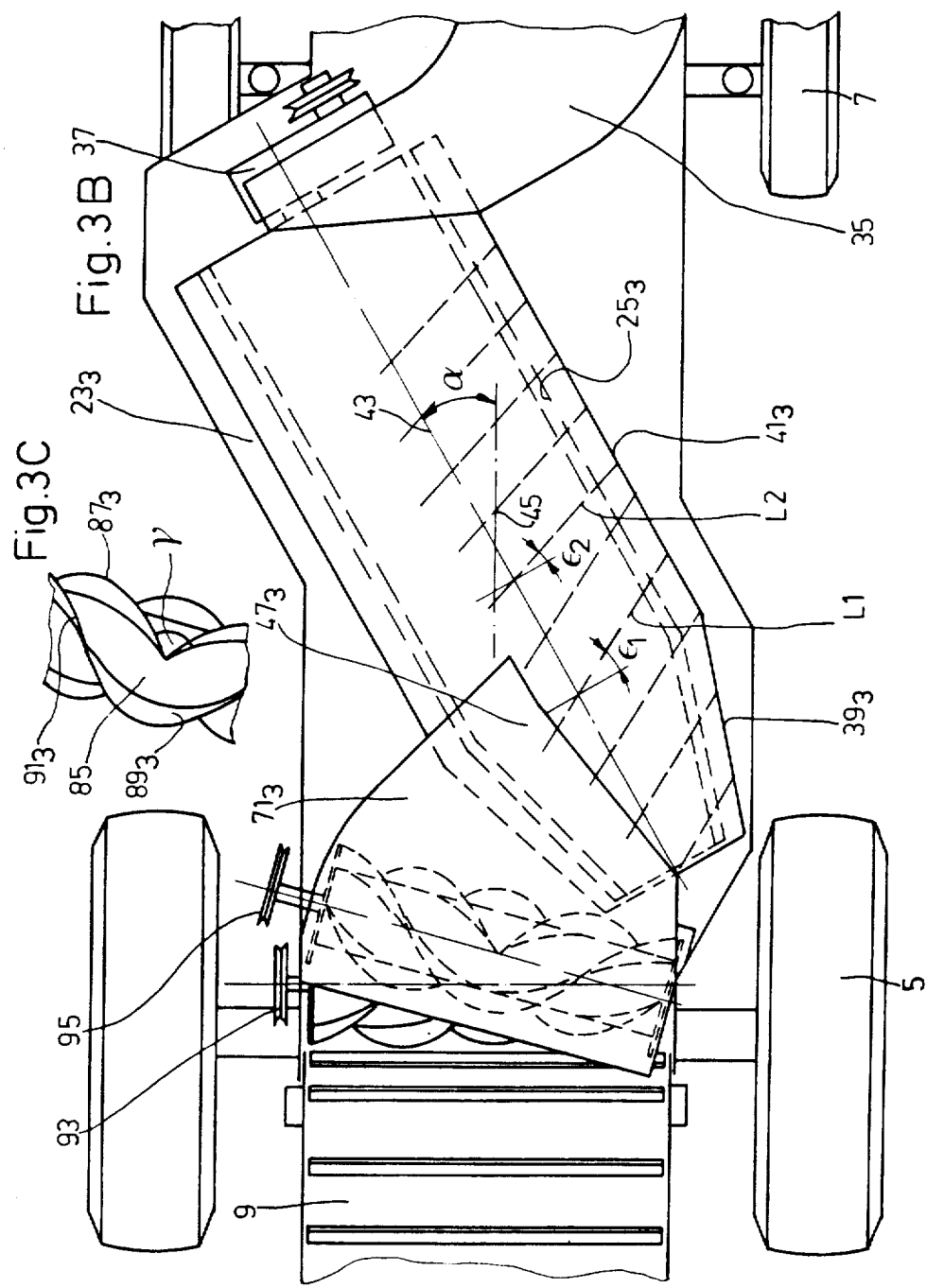

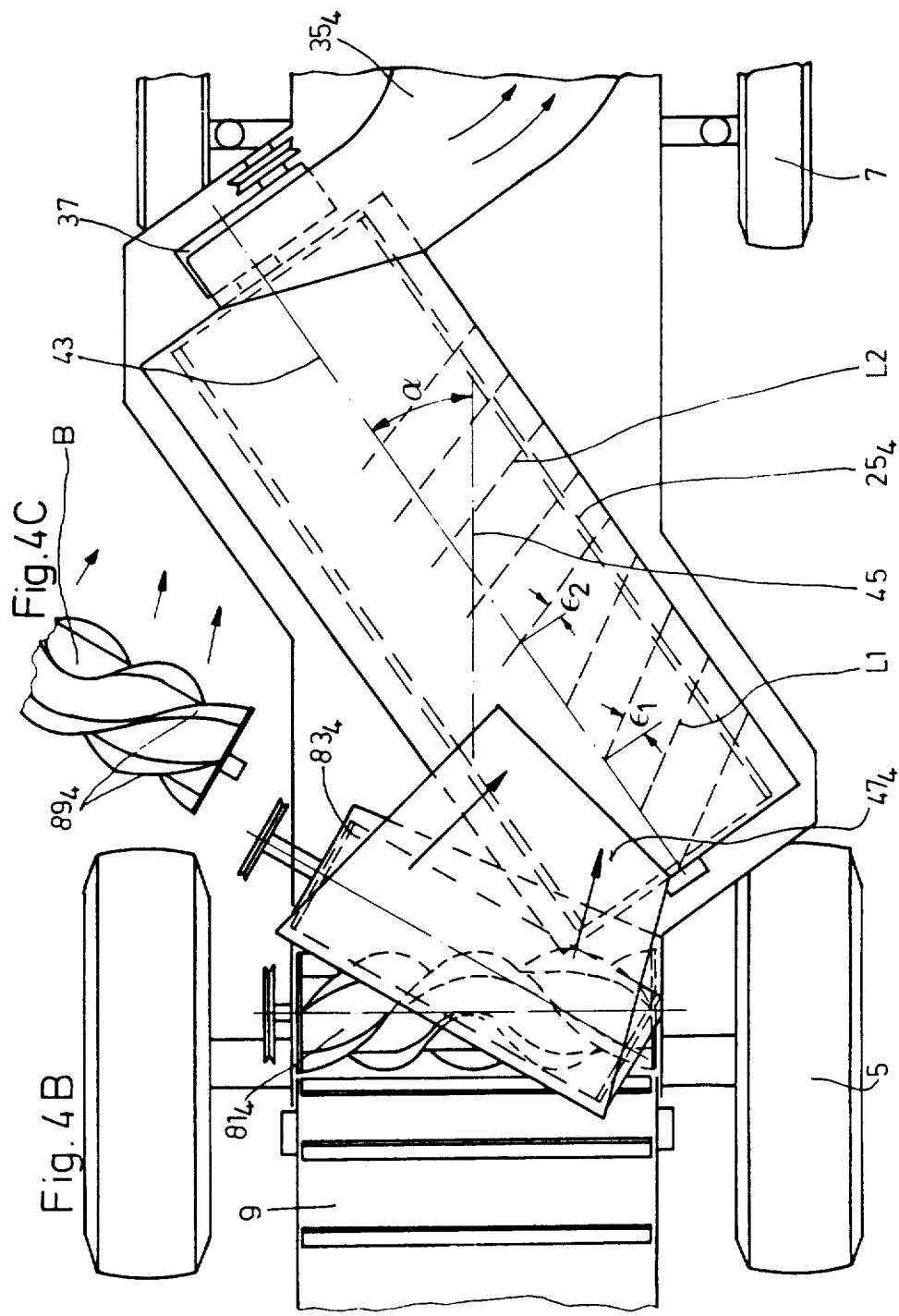

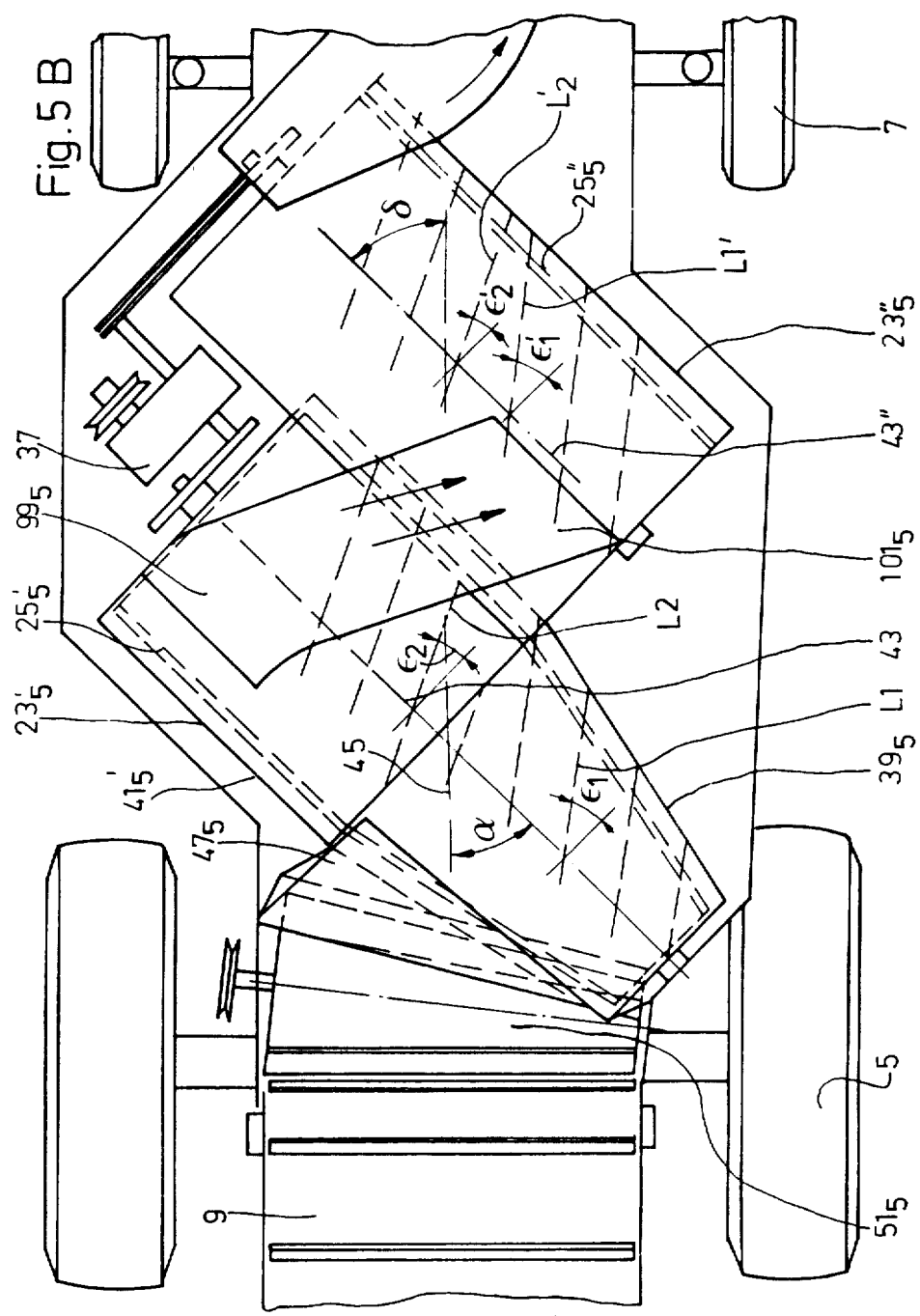

COMBINE HARVESTER WITH ANGLED AXIAL THRESHER

The invention concerns itself with a combine harvester with axial thresher according to the preamble of claim 1.

In axial threshers the harvested product cut by a mowing device is introduced via a conveyor in the threshing and separating means proper, which has a rotary threshing and separating drum or a drum assembly within a housing. The harvet or threshed product is passed in spirals into the threshing means tangentially along the periphery of the threshing drum so that it repeatedly passes the threshing agents and the period of action thereof on the threshed product is extended.

In order to feed without problem the threshed product to the threshing and separating means and to avoid blocking at the feeding point, the threshed product must be fed as tangentially as possible to the threshing drum or drum assembly. For this there exist several possibilities that depend on the geometric arrangement of the threshing drum on the combine harvester and also on the position of said threshing drum relative to the other working agents such as the mowing device or the conveyor.

The axial thresher is customarily aligned with the drum axis in the longitudinal or travel direction of the combine harvester. The conveyor can then be constructed as a so-called side conveyor that transfers laterally tangentially into the threshing means the harvest product cut by the combine harvester situated likewise laterally on the combine harvester (sic). It is true that a smooth tangential introduction of the harvest product into the threshing means is obtained hereby, but at the same time the width of the combine harvester becomes excessive. Since combine harvesters must also move on public highways, their width must be adapted to the customary trail widths. In the construction indicated this is possible only when the operating agents that are laterally unloaded such as the mowing device and the conveyor can be swung down on the highways in the traffic so that the combine harvester does not exceed the admissible vehicle width. This of course requires an expensive construction.

Another possibility consists in arranging the threshing means across the travel direction of the combine harvester so that the axis of the threshing drum extends perpendicularly to the longitudinal axis of the combine harvester. The harvested product cut by the mowing device disposed in the travel direction before the combine harvester can here be tangentially transferred relatively without problem into the drum of the threshing means via an attached conveyor such as an inclined elevator. In this construction the length of the threshing drum and therewith indirectly also the period of action of the threshing agents upon the harvested product are limited by the width of the combine harvester predetermined by the traffic on public highways.

It is true that it has been proposed to render possible the movement on public highways with such a combine harvester in a direction of the rotating means shifted 90° in relation to the working direction, but this again requires an expensive construction.

A review of the above mentioned combine harvesters or threshing apparatus known already can be found in the periodical "Principles of Farming", vol. 19, 1969, No. 1, pages 9 to 17.

For the above mentioned reasons related to transportation there is often used today a combine harvester structure where the mowing device, the conveyor and the threshing means are arranged in succession in the travel direction of the combine harvester, the axis of the threshing drum being aligned in the travel direction, see German published application No. 26 26 815. In such a structure the flow of harvested product advanced by the conveyor that is generally built as an inclined elevator must be reoriented and eventually split up. In the combine harvesters known already this is accomplished by a bucket wheel that revolves around the drum axis and is connected to the conveyor, said bucket wheel having perpendicular vanes such as three helicoidally offset vanes in the form of substantially flat triangular iron plates. Attached to the bucket wheel is provided an axial cone. The harvested product is grasped by the vanes, reoriented by the helicoidal movement, and compressed along the cone into the tangential direction of insertion on the periphery of the threshing drum. Such a reorientation can on one hand disadvantageously affect the uniformity of the charge of the rotary means.

On the other hand, it must be considered that the harvested product cut by the mowing device and transported by the conveyor is fed to the threshing means as a relatively solid mat. Considerable forces are needed to split up this mat of harvested product by means of the bucket wheel and to reorient it about the required high cutoff angles until reaching the tangential point of insertion into the rotary means. Said forces essentially act in the abaxial area of the bucket wheel, that is, in the area of the periphery of the individual bucket wheel vanes. Depending on the amount of the cut harvested product accumulated, it can occur that these vanes be overloaded in the area of their periphery whereby either a continuous rotation of the bucket wheel is prevented or even one of the vanes can be bent or destroyed.

German laid-open application No. 28 30 162 has disclosed an axial thresher in which, similarly to the above mentioned combine harvester, the conveyor and the axial threshing and separating drum are disposed in succession. To introduce the harvested product in the threshing and separating drum, there is provided an inserting or auger device constructed in the shape of a spiral and that rotates with the threshing drum about a common axis. The cut harvested product can be introduced in the threshing means by said auger device over a large angular sector so that a uniform loading of the drum would result. But there also remain here high cutoff angles and strong forces on the auger device resulting therefrom.

The invention is based on the problem of providing a combine harvester with an axial thresher of the kind mentioned at the beginning where a uniform loading of the threshing means with harvested product and a smooth transfer of the harvested product to the threshing and separating drum are possible in the axial-tangential direction. Besides, long threshing and separating paths must be available and this in spite of the narrow build of the combine harvester without expensive special constructions to permit also an easy movement on public highways.

According to the invention, there is provided a movable combine harvester with axial thresher including a mowing apparatus, a conveyor connected thereto for the cut harvest product, a rotating threshing and separating drum assembly definint an axis of rotation accommodated in a drum housing for axially threshing harvested product, and an inserting device for transferring the harvest product delivered by the conveyor into an inlet of said drum housing, wherein the rotation axis (43) of the threshing and separating drum assembly (25) is disposed in the horizontal plane at an acute angle to the longitudinal axis (45) of the combine harvester (1), the drum housing having at the forward end facing the conveyor (9), a tangential inlet (47₁) defined by a sidewall of the housing which serves as a guide wall (49₁), for the harvested crop, extending to guide said crop from the conveyor (9), into said tangential inlet (47₁).

In conformity with those features, the axis of the threshing and separating drum extends accordingly in the horizontal plane of the combine harvester at an acute angle in relation to the advancing direction of the harvested product in the conveyor, that is, the travel direction of the combine harvester. In this manner it is possible to provide on the forward end of the separating drum or of the drum housing in a nearly tangential inlet that obviously can also have a certain axial component according to the direction of movement of the harvested product along the periphery of the threshing drum or drum assembly. The tangential inlet opens out in the drum housing, preferably above the drum axis, so that practically all the harvested product delivered by the conveyor can be gently reoriented into the tangential inlet by the inserting device on a relatively long path.

The positioning of the axis of the threshing and separating drum or drum assembly opposite the travel direction of the combine harvester has the advantage that the necessary cutoff angle of the flow of harvested product advanced by the conveyor is substantially reduced in comparison to the known combine harvesters where the drum axis is aligned in the travel direction of the combine harvester. By positioning the axis of the threshing and separating drum or drum assembly opposite the travel direction of the combine harvester, there remains in addition sufficient space between the conveyor and the tangential inlet into the drum housing to ensure an easy transfer of the harvested product into the drum housing with the threshing and separating drum. In addition, the threshing and separating drum or drum assembly can, in spite of said positioning opposite the travel direction of the combine harvester, be disposed within the width of the combine harvester without it being necessary thereby to shorten the length of the drum or drum assembly in comparison with the known structures. Accordingly, the harvest or threshed product in a combine harvester in conformity with the invention runs through at least the same distance as is the case in the already known combine harvesters with drum assemblies in the travel direction. The individual working agents of the combine harvester, especially the inserting device and the drum assembly, are firmly installed means on the combine harvester that are within the width of the vehicle so that with one combine harvester according to the invention it is easily possible to move also in public highways.

The harvested product advanced by the conveyor can also be smoothly transferred into the tangential inlet of the threshing and separating drum via a tangential inlet in the drum housing that opens out in a conically tapering front portion of the drum housing. Hereby, on the one hand, the lateral space between the conveyor and the tangential inlet into the drum housing is further enlarged, and on the other, the necessary cutoff angle for the harvested product is at the same time reduced.

Hereby the inserting device between the conveyor and the tangential inlet can be compact and of small build. In addition, because of the conical tapering of the threshing drum, the harvested product, after being introduced, is threshed first gently and then at increasing peripheral speed.

Specially adequate as inserting devices are rotary agents built as a four-sided truncated pyramid having a rotating axis that extends horizontally, but is bent in the direction of reorientation of the harvested product. The threshed product is already reoriented to this inserting device and passed along a baffle plate into the tangential inlet. This truncated pyramid can also interact with a bucket wheel by which the reoriented and assembled threshed product is pushed into the tangential inlet.

It is likewise possible advantageously to use as inserting device a roller assembly comprised of two rollers positioned with their axes against each other and provided along their periphery with helicoidally extending gripping plates. With such an assembly the harvested product delivered by the conveyor can also be easily reoriented in the tangential inlet.

Thus, in a combine harvester according to the invention the advantage of the tangential inlet in axial threshers, that is, the smooth introduction of the harvested product in the threshing direction and also the uniform loading of the threshing device, is combined with the advantage of threshers where the individual working means are disposed in succession in the travel direction of the combine harvester, that is, with the advantage of longer threshing paths or a longer period of action of the threshing agents proper upon the threshed product. In order to ensure the axial flow of the harvested product, it is proposed to attach to the inner walls of the drum housing spiral conducting elements. By virtue of the advantageous steeper adjustment of the conducting elements in the area of the tangential inlet, it is ensured that the introduced harvested product be axially moved so far after one cycle that it will not hinder the feeding of more product.

Other embodiments and advantages of the invention result from the sub-claims in combination with the specification that follows where the invention is explained in detail in five embodiments in relation to the drawing. In the drawing:

FIGS. 1A to 5A show respective side views of different embodiments of a combine harvester according to the invention;

FIGS. 1B to 5B show respective top views on the individual embodiments of combine harvesters according to FIGS. 1A to 5A;

FIGS. 3C and 4C show respectively a detail of FIG. 3B and FIG. 4B.

Figure 1B:
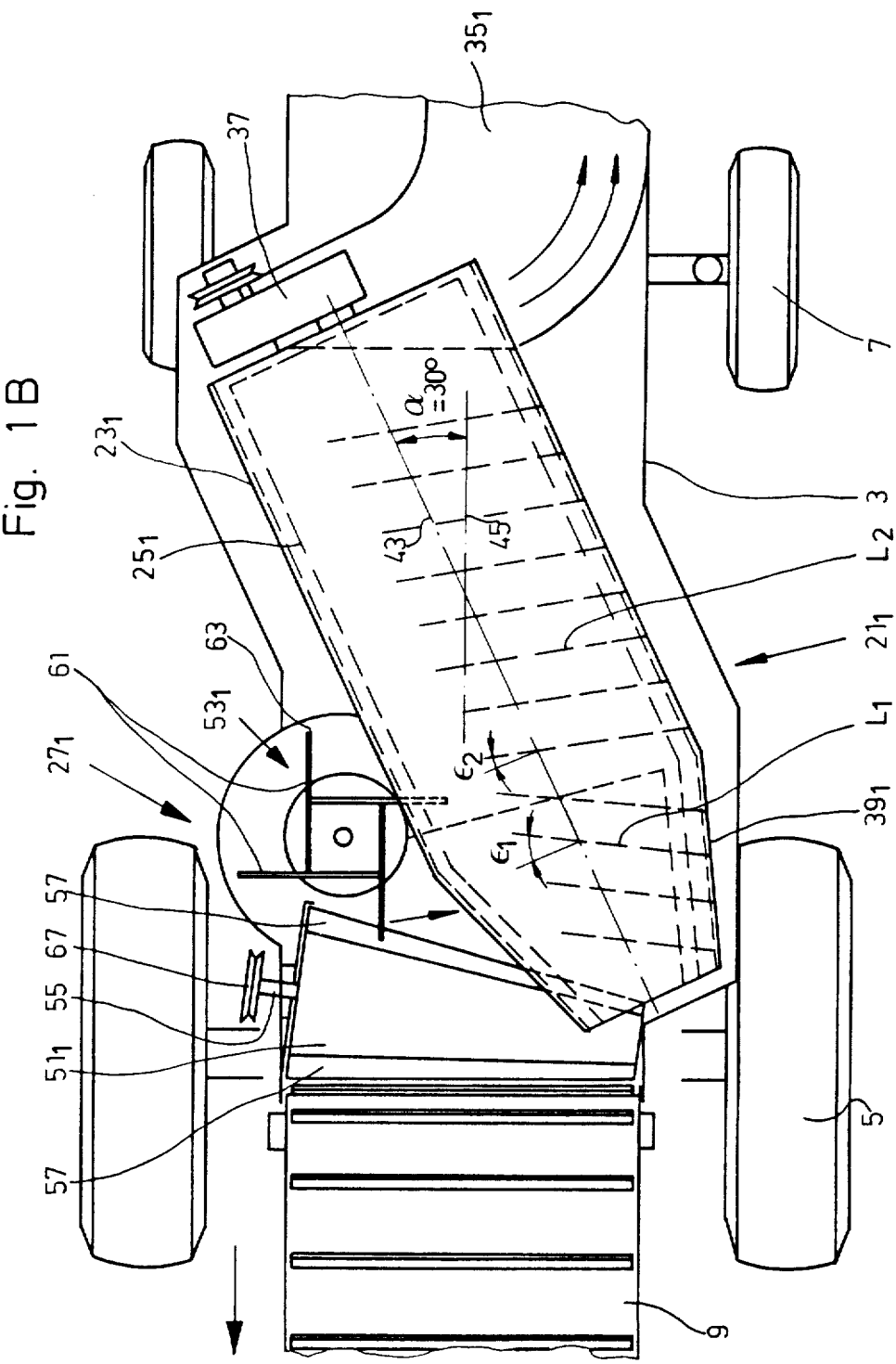

In each figure the parts and devices that are alike or act alike are respectively designated with the same reference numerals, there being added to each reference numeral an index according to the respective figure. This indexing is provided of course only in parts that are essential to the invention while other parts and devices not directly concerned with the invention are characterized by the same reference numerals without indexing.

A combine harvester only partially shown in FIGS. 1A and 1B includes a chassis 3 in which are provided two relatively large driving wheels 5 in the front and two smaller steering wheels 7 in the rear. The combine harvester has on its forward end, in the travel direction, a mowing device not shown here and connected thereto a conveyor 9 in the form of an inclined elevator. The conveyor 9 is accommodated in a housing 11 and, passed around two or more track wheels 13, it has a conveyor belt chain 15 provided with several carrier bars 17 extending across the advancing direction. The harvested product cut by the mowing device is transported by the conveyor belt chain 15 that at the bottom of the figures runs through the carrier bars in the direction of the arrow.

The combine harvester has on the chassis an axial thresher $21_1$ that essentially comprises a drum housing $23_1$ with a threshing and separating drum $25_1$ revolving therein, and an inserting device $27_1$ by which the harvested product delivered by the conveyor is introduced in the drum housing. The drum housing is provided in the lower portion with openings so that the grains separated by the threshing drum $25_1$ from the harvested product can fall into the collecting means 31 that feed the graains and the impurities still contained therein such as chaff and short straw to a cleaning means 29. In this cleaning means 29 that has several sieves the impurities are separated from the grains and discharged under the action of a fan 33. The harvest material that has run through the drum housing $23_1$ with the threshing drum $25_1$ and has been threshed out, that is, the straw, is ejected through a discharge point $35_1$ at the rear end of the drum housing $23_1$. The threshing drum $25_1$ is set in motion by a drive 37. The threshing drum $25_1$, which is provided with threshing and separating bars, is of a structure known per se and therefore needs not be further described.

The drum housing $23_1$ that surrounds the threshing drum $25_1$ has on its forward end facing the conveyor 9 a conically enlarging inlet portion $39_1$ that changes into a subsequent coaxial cylindrical housing portion. The threshing drum $25_1$ that revolves in the housing $23_1$ has a corresponding configuration. The common axis 43 of the threshing drum 25, and the drum housing 23, has relative to the longitudinal axis 45 of the combine harvest that coincides with the travel direction of the latter an acute angle $\alpha$ that in this embodiment amounts to about 30°. In the upper area and on the inner side of the drum housing $23_1$ there are attached diagonally ($\epsilon_1$, $\epsilon_2$) positioned baffle plates $L_1$ and $L_2$ to ensure the axial flow of the material. The forward baffle plates $L_1$ are attached in the area of the inlet 47 and have a large climbing angle $E_1$ in relation to the direction of rotation of the threshing drum $25_1$ so that the material, after one cycle in the housing, will not impinge again on the inlet opening and hinder the material that follows. In the area of the baffle plates $L_2$ a slower axial movement is desired. Despite this position of the drum axis 43 in a horizontal plane relative to the longitudinal axis of the combine harvester, a threshing drum of conventional length that works according to the axial threshing system can also be disposed within the vehicle width, as it results from FIG. 1B. Owing to this angle arrangement, there results between the end of the conveyor 9 and the forward end of the drum housing a relatively large free space wherein the inserting device $27_1$ can be situated. As it results from FIG. 1A, the drum axis 43 is upwardly positioned in vertical direction so that the drum housing $23_1$ and therewith also the threshing drum $25_1$ easily rise backwards from the forward end. The forward end of the conic inlet portion $39_1$ of the drum housing $23_1$ is above the upper end of the conveyor 9. A stone trap S is situated in the area of the discharge opening of the conveyor 9 and below the inserting device $27_1$.

On the side of the conic inlet portion $39_1$ remote from the conveyor 9 there is provided in the drum housing $23_1$ a tangential inlet $47_1$ that extends over the whole length of the conic inlet portion $39_1$ and that is defined by an outer sidewall $49_1$ that runs tangentially into the outer jacket of the here conic drum housing. Said sidewall $49_1$ changes into the outer wall of the conic drum housing approximately at the height of the drum axis 43. This sidewall $49_1$, which serves at the same time as guide wall for the harvested product to be introduced in the drum housing with the threshing drum, extends downwardly into a lightly wound path to a distance such as to attach itself directly over the whole width of the conveyor 9 so that the harvested product advanced by the conveyor 9 over the carrier bars 17 is conveyed on this guide wall. The harvested product is then pushed through the inserting device $27_1$ along the guide wall $49_1$, at the same time it is reoriented, and finally tangentially inserted into the conic inlet portion $39_1$ in the area of the tangential inlet $47_1$.

The inserting device $27_1$ chosen for this comprises a rotary conveyor $51_1$ in the form of a truncated pyramid and a screw wheel $53_1$. The axis 55 of the truncated-pyramid conveyor extends horizontally in a manner such that the tapered end of the truncated pyramid conveyor is on the side of the conic inlet portion $39_1$ and at a certain rotating position a side edge of the truncated-pyramid conveyor is parallel with the front side of the conveyor 9, as it is shown in FIG. 1B. The truncated-pyramid conveyor $51_1$ also has carrier bars 57 that as extension of the pyramide sides project clockwise over the inner truncated pyramid. The conveyor 51 rotates counter-clockwise, as indicated with the arrow in FIG. 1A. Said front wall $49_1$ is shaped in the area of the truncated-pyramid conveyor in a manner such that upon rotation the carrier bars 57 are led parallel with the surface of the guide wall. The harvested product delivered via the carrier 9 is wholly grasped upon rotation of the truncated-pyramid conveyor by the carrier bars 57 thereof and owing to their position is wholly reoriented to the outer guide wall $49_1$. The harvested product delivered in the enlarged area of the truncated-pyramid conveyor is led to the guide wall by the screw wheel $53_1$ and subsequently further compressed into the tangential inlet $47_1$. The screw wheel $53_1$ has a perpendicular rotation axis and revolves counter-clockwise. The vanes 61 of the screw wheel extend with their surfaces likewise perpendicularly in vertical direction, as illustrated in FIG. 1B, disposed in the form of a case around the perpendicular rotation axis 59. The surfaces of the individual vanes that project over this case have a triangular configuration and each one ends in a peak 63, the side boundaries starting from the peak 63 corresponding to concavely extending curvatures. The peaks 63 of the individual vanes project away over the upper edge of the truncated-pyramid conveyor $51_1$. Owing to the concave configuration of the side boundaries of the individual vanes, the truncated-pyramid conveyor $51_1$ and the screw wheel $53_1$ can rotate unhindered and independently of each other. The harvested product delivered in the enlarged area of the truncated-pyramid conveyor is guided by the individual vanes 61 of the screw wheel along the outer guide wall $49_1$ in direction toward the tangential inlet $47_1$. The tangential inlet $47_1$ is closed also by an upper limiting wall 65, only indicated in FIG. 1A, that extends over the whole width of the tangential inlet, that is, over the whole width of the conic inlet portion $39_1$, and covers the screw wheel $53_1$ and the truncated-pyramid conveyor $51_1$ in the area of the flow of harvested product.

The truncated-pyramid conveyor $51_1$ is set in motion via a driving wheel 67 upon the rotation axis 55 by a driving motor, not shown here, that likewise sets in motion the screw wheel $53_1$.

The harvested product delivered by the conveyor 9 is all grasped by the truncated-pyramid conveyor $51_1$ and during the rotation is mounted nearly perpendicularly along the guide wall $49_1$, and at the same time reoriented in the direction of the tangential inlet. Here the flow of harvested product is passed over the stone trap S, stones and similar heavy foreign parts being separated from the product flow. The mounted and reoriented flow of harvested product is pushed farther in the direction of the tangential inlet by the product that follows, the flow of the harvested product collected in the enlarged area of the truncated-pyramid conveyor $51_1$ being pushed by the screw wheel $53_1$ toward the guide wall $49_1$ in the direction of the tangential inlet.

The reorientation and the tangential introduction into the drum housing $23_1$ are indicated in FIG. 1A with the arrow $P_1$. As it can be seen from FIGS. 1A and 1B, there is needed for introducing the flow of harvested product into the drum housing $23_1$ only a slight reorientation of the flow of harvested product, which is possible with relatively weak conveying and reorienting forces. The carrier bars 57 of the truncated-pyramid conveyor $51_1$ and the vanes 61 of the screw wheel $53_1$ are only insignificantly stressed hereby so that by using the adequate dimensions the damage thereof is eliminated.

As indicated by the arrow $P_1$ in FIG. 1A, the threshed product runs into the drum housing $23_1$ counter-clockwise along the threshing drum $25_1$, when looking from the front, to the drum housing. For this reason the tangential discharge point $35_1$ at the end of the drum housing 23 is disposed in the lower area of the drum housing and likewise downwardly oriented. The threshed out harvested product is in this manner ejected from the combine harvester relatively close to the ground.

Figure 2A:
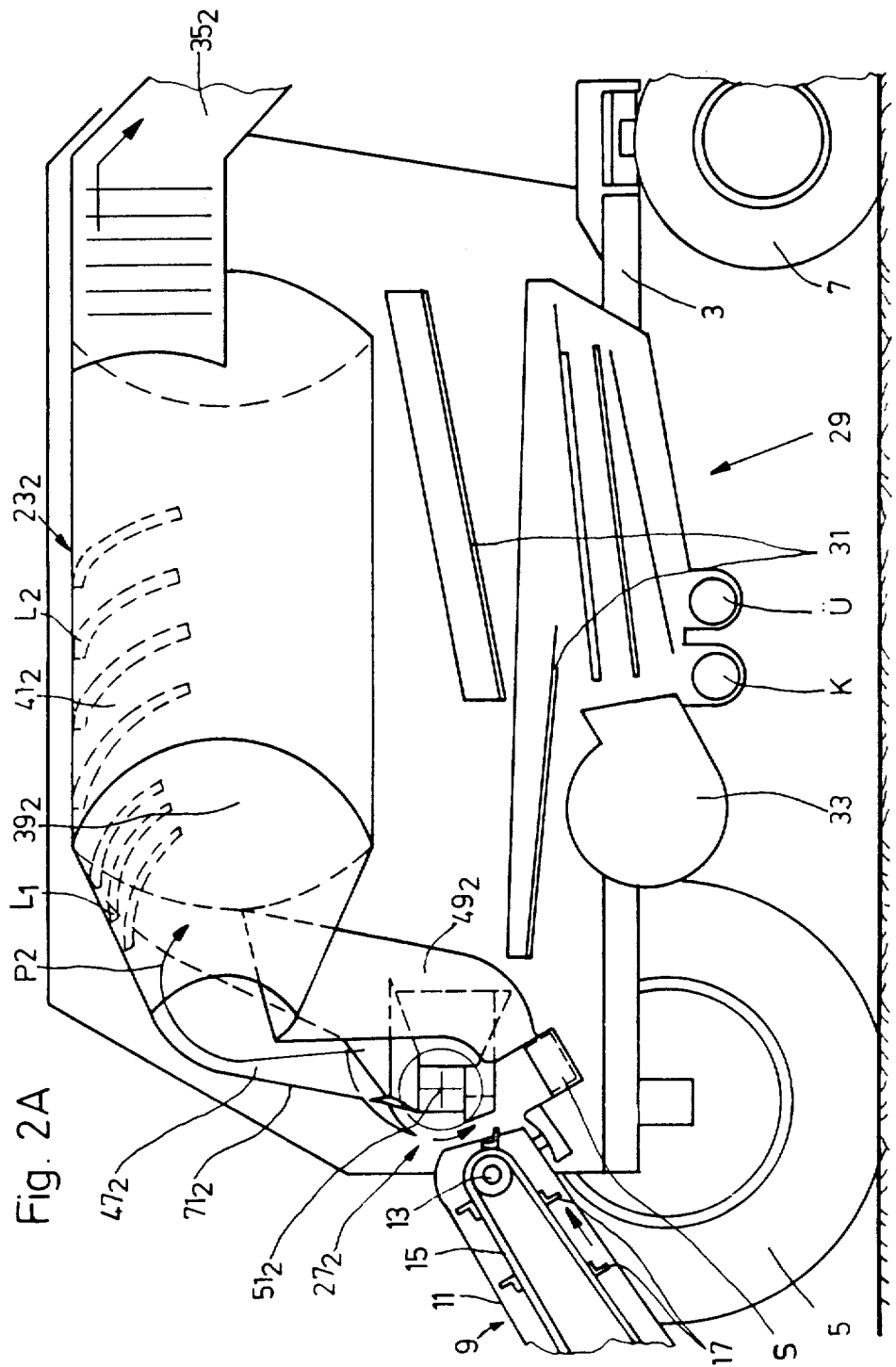

In FIGS. 2A and 2B is illustrated a second embodiment of a combine harvester $1_2$ that again has a chassis 3, driving wheels 5, steering wheels 7, a conveyor 9 in the form of an inclined elevator with a housing 11 and track wheels, a conveyor belt chain and carrier bars 11, and a stone trap S. The axial thresher $21_2$ again has drum housing $23_2$ with a threshing drum $25_2$ supported therein and an inserting device $27_2$. Beneath the drum housing $23_2$, which is sieve-like apertured toward the bottom, there are again provided collecting means 31, which feed the threshed out grains and the impurities still contained therein to a cleaning means 29, and a fan 33. At the end of the drum housing is disposed a discharge point $35_2$ for the threshed out harvested product. The threshing drum $25_2$ is set in motion by a corresponding drive 37.

The drum housing $23_2$ again has a cylindrical housing portion $41_2$ and a front conic inlet portion $39_2$. In the cylindrical housing portion $41_2$ is coaxially supported a likewise cylindrical threshing drum $25_2'$. The drum axis 43 assumes in respect to the longitudinal axis 45 of the combine harvester an acute angle $\alpha$. The threshing drum $25_2'$ extends only over the cylindrical housing portion $41_2$. The conic inlet portion $39_2$ in this case is mounted about the drum axis 43 not symmetrically but obliquely angularly in relation thereto forming an acute angle $\beta$. The axis of this drum portion is designated by $43'$. The angle $\beta$ is selected in a manner such that the generatrix M of the drum housing $23_2$ forms at the height of the drum axis 43 a straight line as illustrated in FIG. 2B. A conically built rotating drum here designated with $25_2''$ revolves about the axis $43'$ of the conic inlet portion $39_2$. By the position of the drum housing $23_2$ at an acute angle in relation to the longitudinal axis of the combine harvester and by the additional position of the axis of the conic inlet portion $39_2$ in relation to the drum axis 43, there again results between the end of the conveyor 9 and the conic inlet portion $39_2$ a free space where is situated an inserting device $27_2$. Said inserting device $27_2$ transfers the cut harvested product delivered by the conveyor 9 into a tangential inlet $47_2$ that extends over the whole width of the conic inlet portion $39_2$ and in this case is disposed on the side thereof facing the conveyor 9. Here the harvested product overflows likewise a stone trap S. The tangential inlet $47_2$ is defined by an outer sidewall or guide wall $49_2$, seen from the conveyor 9, which wall ends over the whole length of the conic inlet portion in the tangential inlet $47_2$ and from there it again extends, at first perpendicularly and then in a light spiral movement, to the end of the conveyor 9. The tangential inlet $47_2$ is defined on the other side by a front sidewall $71_2$ that ends almost tangentially in the conic inlet portion $39_2$. Said two sidewalls run slightly conically into the area of the tangential inlet $47_2$, and thus a relatively narrow inlet slot corresponding to the mass of the collected threshed product results on the tangential inlet. This front sidewall also covers the inserting device $27_2$, as shown in FIG. 2A; for the sake of clarity this covering is not completely drawn in FIG. 2B. The inserting device $27_2$ comprises in this case only a truncated-pyramid conveyor $51_2$ that corresponds in configuration and geometric arrangement to the truncated-pyramid conveyor according to FIGS. 1A and 1B. The sidewall $49_2$ is accordingly built in a manner such that when the truncated-pyramid conveyor rotates, the carrier bars 57 thereof be guided parallel with the sidewall $49_2$. The front sidewall $71_2$ is likewise adapted to the geometric expansions of the truncated-pyramid conveyor $41_2$ when it rotates, but here scarce free space remains between the carrier bars 59 and the sidewall $71_2$ so that the harvested product cannot again be transported away from the inserting device $27_2$.

The harvested product delivered by the inclined elevator 9 at the underside thereof is taken along by the counter-clockwise rotating truncated-pyramid conveyor $51_2$ with the carrier bars 57 thereof and is transferred to the guide wall $49_2$. The harvested product is here reoriented and at the same time mounted almost perpendicularly and compressed in the direction of the tangential inlet $47_2$. Because of the conic entrance of both sidewalls $49_2$ and $71_2$ of the tangential inlet $47_2$, the front sidewall $71_2$ assumes in the area of the inlet slot of the tangential inlet and above said inlet slot the guidance of the harvested product so that the latter, as indicated with the arrow $P_2$ in the figure, viewed from the front, is guided clockwise about the conic portion of the threshing drum $25_2'$. In this manner there result only short reorientation and feeding paths to the threshing drum housing for the harvested product delivered by the conveyor 9. The harvested product can thus be reoriented and introduced by a single truncated-pyramid conveyor, since the tangential inlet $47_2$ already extends practically over the whole width thereof.

In this embodiment the harvested product can also be easily transferred into the threshing drum housing. The inlet into the threshing drum housing is tangential with certain axial components according to the direction of movement of the harvest product along the divided threshing drum.

As it results from FIG. 2B, the outer limits of the conic threshing drum $25_2''$ and of the conic threshing drum $25_2'$, that is, those remote from the conveyor 9, are nearly in alignment. By the mentioning pitching off of the axes of the conic threshing drum portion $25_2''$ and of the cylindrical threshing drum portion $25_2'$ and the mentioned alignment, the harvested product is easily transferred from the conic inlet portion $39_2$ into the cylindrical portion $41_2$ of the threshing drum housing. For obtaining an axial conveying component, especially in the inlet area, there are disposed in the upper area of the threshing drum $41_2$, like in the first embodiment, baffle plates $L_1$ and $L_2$ that interact with the threshing and separating bars of the threshing and separating drum $25_2$. For the sake of clarity, the baffle plates are not illustrated in view 2B.

Corresponding to the passage of the harvested product in clockwise direction through the threshing drum housing, the discharge point $35_2$ is situated in this case in the upper area of the threshing drum housing above the drum axis 43. The discharge point $35_2$ is downwardly drawn, as indicated in FIG. 2A, to obtain that the harvested product be ejected relatively close to the ground.

In the combine harvester described in FIGS. 2A and 2B, the drum axis 43 of the drum housing $23_2$ extends almost horizontally. It is evidently possible also here to select a certain angle of incidence against the horizontal line.

Besides, it can be seen from FIG. 2B that the longitudinal direction of the inlet slot of the tangential inlet $47_2$ coincides with the direction of the outer generatrix of the conic threshing drum portion $25_2''$. Insignificant departures herefrom are likewise admissible; with this inlet direction it is possible to take into accound axial components of the movement of the harvested product within the threshing drum housing.

The two portions $25_2'$ and $25_2''$ of the threshing drum $25_2$ can be set in motion by the same drive 37. In this case a corresponding power-transmitting buckling articulation 73 is provided at the break point of the two drum axes 43 and 43'.

Figure 3A:
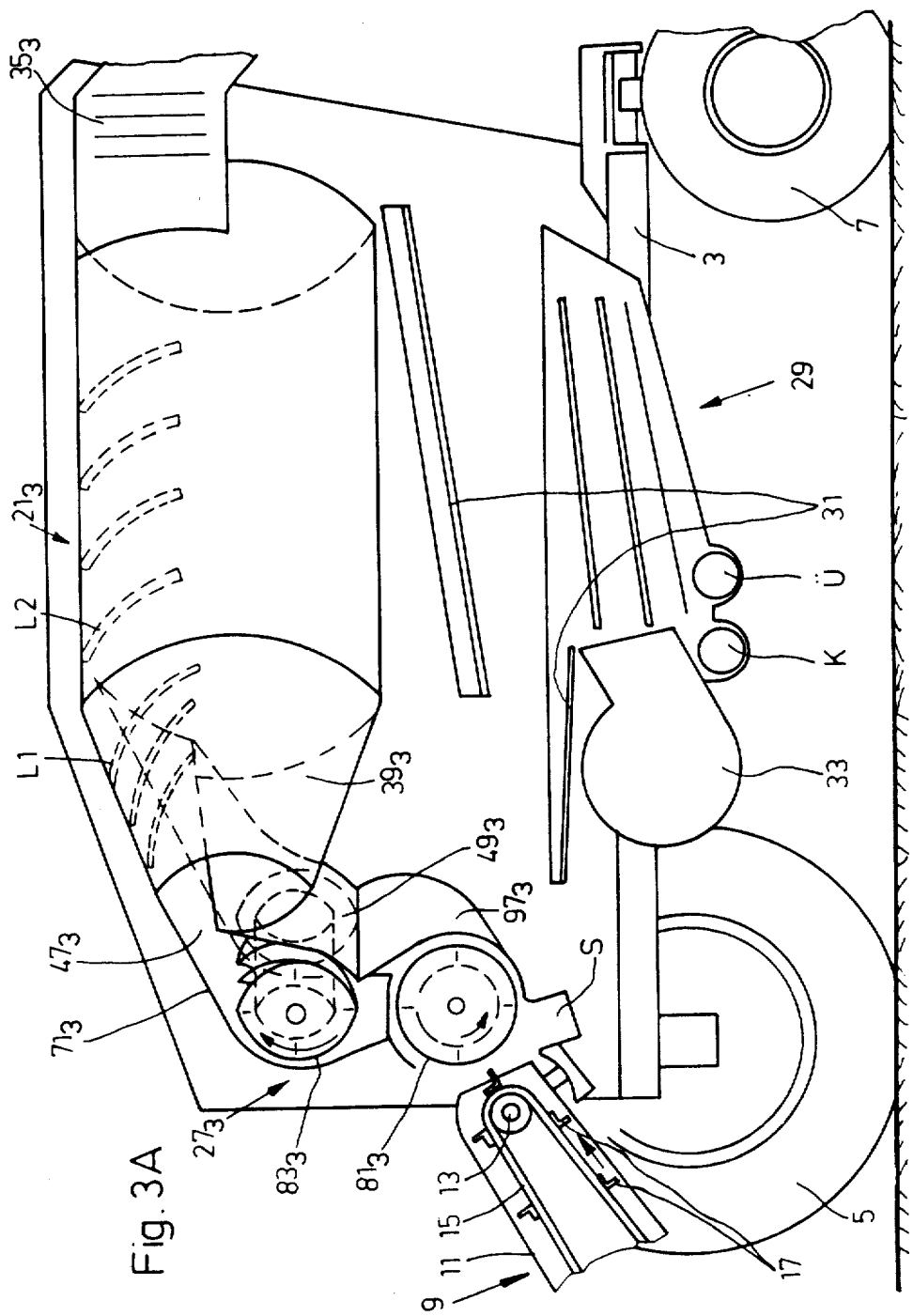

In FIGS. 3A and 3B is illustrated a third embodiment of a combine harvester $1_3$. The combine harvester again includes a chassis 3, driving wheels 5, steering wheels 7, a conveyor 9 in the form of an inclined elevator with a housing 11, track-wheels 13, a conveyor belt chain 15 with carrier bars 17 and in addition an axial thresher $21_3$. The thresher comprises a drum housing $23_3$ with a rotating threshing and separating drum $25_3$ mounted therein, an inserting device $27_3$ to transfer the harvested product delivered by the conveyor 9 into the drum housing, and collecting means 31 for the grains and other components threshed out from the harvested product. Said collecting means 31 again feed the separated material to a cleaning means 29 formed of several sieves. The collecting means 31 are disposed beneath the threshing drum $25_3$ that is sieve-like apertured toward the bottom. With the cleaning means 29 is associated a fan 33.

The drum housing $23_3$ is a drum housing corresponding to the first embodiment according to FIGS. 1A and 1B, here of course with a horizontal drum axis 43, it comprises accordingly a cylindrical housing portion $41_3$ and on the forward end a coaxial conically enlarging inlet portion $39_3$. The drum axis 43 common to both portions is arranged at an acute angle $\alpha$ against the longitudinal axis 45 of the combine harvester. The threshing drum $25_3$ disposed within the drum housing $23_3$ is set in motion by a drive 37 and, corresponding to the outer contour of the drum housing, it comprises, a cylindrical and a conic threshing portion.

In the area of the forward conic inlet portion $39_3$, there is provided on the side of the cone facing the conveyor 9 a nearly tangential inlet $47_3$ that extends over the whole length of the conic length portion. In this embodiment the inlet extends only slightly into the cylindrical housing portion $41_3$. The tangential inlet is disposed over the drum axis 43 and has a front sidewall or limiting wall $71_3$ facing the conveyor 9 and a rear sidewall $49_3$ remote from the conveyor 9. These two sidewalls extend conically in the direction toward the inlet slot of the tangential inlet $47_3$, that is, the distance from each other increases in the direction toward the conveyor 9. On the inner walls of the drum housing there are likewise attached baffle plates $L_1$ and $L_2$ for reinforcing the axial components, especially in the inlet area $47_3$, the front baffle plates $L_1$ having a large climbing angle $E_1$.

As inserting device $27_3$ for the harvest product delivered by the conveyor 9 in the drum housing 21, there is provided a pair of rollers comprised of two driven conveyor rollers $81_3$ and $83_3$. The two conveyor rollers (FIG. 3C) are similarly built and comprise each a cylinder jacket 85 upon which are situated spirally extending grip plates $87_3$ perpendicular to the surface of the cylinder jacket. In the embodiment there are provided on the cylinder jacket 85 four grip plates, each one peripherally offset 90°. The grip plates $87_3$ extend, beginning from one end of the cylinder rollers, first into a screw thread $89_3$ that reaches over a longitudinal half of the cylinder jacket 85 and has an angle at circumference of about 90°. The grip plates subsequently extend into a screw thread $91_3$ of opposite direction until reaching the other end of the cylinder jacket 85 again with an angle at circumference of 90°. The screw threads $89_3$ and $91_3$ that meet in the center of the cylinder jacket 85 define an angle $\gamma$ that is in the direction of rotation of the conveyor rollers $81_3$ and $83_3$ and that in this embodiment amounts to about 90°.

The rollers $83_1$ and $83_3$ are set in motion about their cylinder axes by the driving wheels 93 and 95.

The first conveyor roller $81_3$ extends in its longitudinal direction perpendicular to the advancing direction of the conveyor 9 over the whole width thereof. Beneath the conveyor roller $81_3$ and behind the conveyor 9 is situated a stone trap S. The conveyor roller $81_3$ takes over at its underside the stone-free harvested product delivered by the conveyor 9 at its underside, rotating counter-clockwise, as indicated by the arrow in FIG. 3A. The harvested product is here passed along a guide wall $97_3$ that externally surrounds the roller $81_3$ and that ends in the rear guide wall $49_3$ of the tangential inlet $47_3$. The cut harvested product is led along said guide wall $97_3$ around the periphery of the conveyor roller $81_3$ so far as to be taken over by the conveyor roller 83 that rotates counter-clockwise on the underside thereof. The conveyor roller $83_3$ is in this case above the conveyor roller $81_3$, the rotating axis of which extends horizontally, but is positioned opposite the rotation axis of the conveyor roller $81_3$ in the direction of the drum housing $23_3$, as it results from FIG. 3B. The harvested product delivered by the conveyor roller $81_3$ is taken over by the conveyor roller $83_3$ with the grip plates $87_3$ thereof and reoriented along the sidewall $71_3$ that externally surrounds them, and is led into the tangential inlet $47_3$. The sidewall $71_3$ is in addition passed about one portion of the upper periphery of the conveyor roller $81_3$ in order outwardly to close the inserting device $27_3$.

By means of the two conveyor rollers $81_3$ and $83_3$ with their screw threads $89_3$ and $91_3$ of the grip plates $87_3$, which threads run in opposite directions, the harvested product, while transported from the conveyor 9 to the almost tangential inlet $47_3$, is thoroughly aligned until reaching the desired entrance direction and is introduced almost tangentially in the drum housing $21_3$ with short reorientation and transportation paths. For the reorientation of the harvested product until the tangential introduction in the drum housing, only a relatively small angle adjustment of the two axes of the conveyor rollers $81_3$ and $83_3$ is necessary. The harvested product here is also reoriented and introduced into the drum housing easily and without great power consumption so that damage to the grip plates $87_3$ is eliminated when they are adequately dimensioned.

Figure 4A:
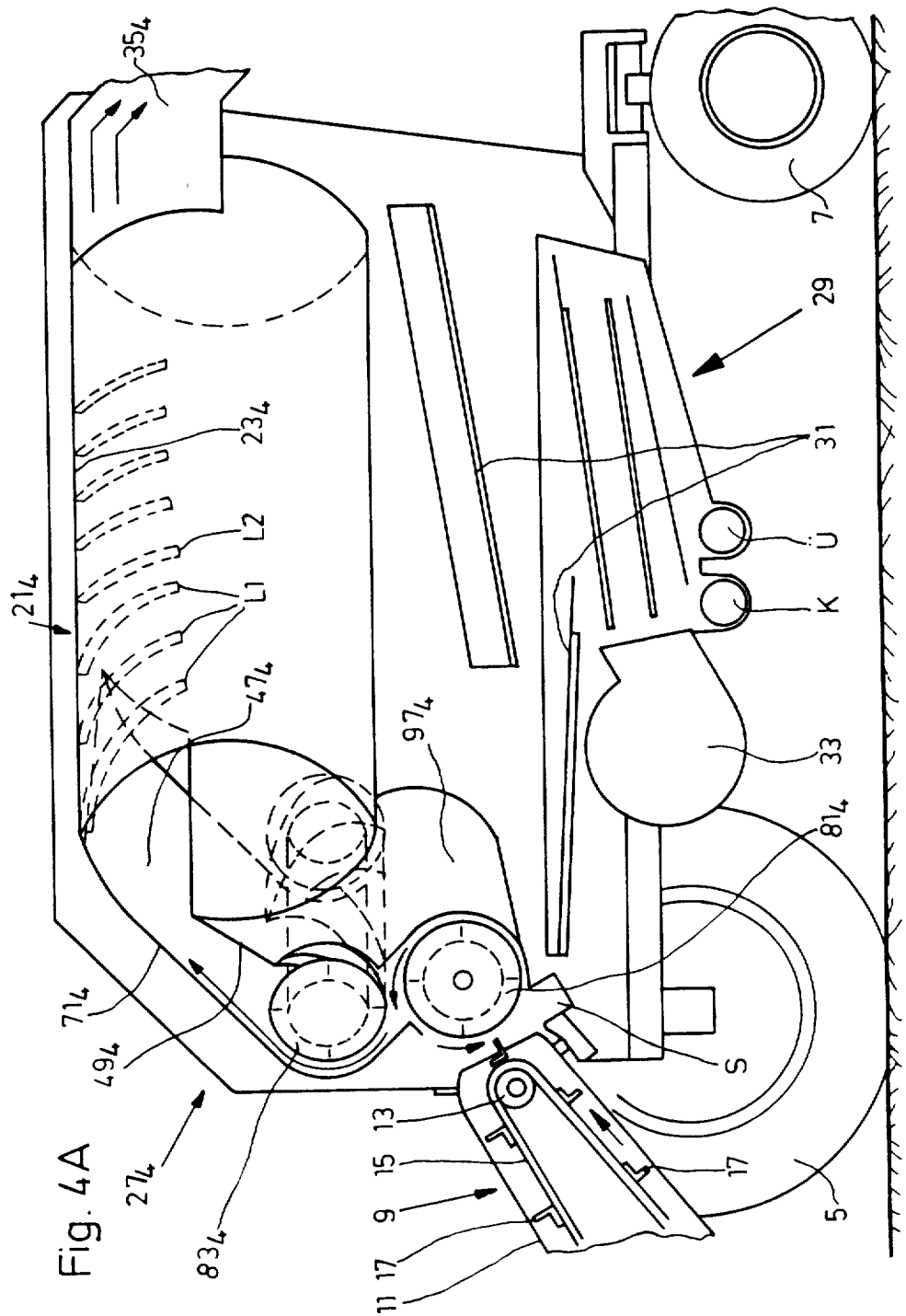

In FIGS. 4A and 4B is illustrated another embodiment of a combine harvester $1_4$. This combine harvester again has a chassis 3, driving wheels 5, steering wheels 7, a conveyor in the form of an inclined elevator with a housing 11, track wheels 13, a conveyor belt chain 15 with carrier bars and an axial thresher $21_4$. The drum housing $23_4$ is cylindrical and horizontally aligned with the longitudinal and drum axis 43. The drum housing $23_4$ is situated above the end of the conveyor 9. Between the end of the conveyor 9 and the drum housing $23_4$, there is provided an inserting device $27_4$ disposed beneath a stone trap S. Beneath the drum housing $23_4$ that is sieve-like apertured toward the bottom is again provided a collecting means 31 that collects the threshed out grain material and feeds it to a cleaning means 29 provided with sieves and acted upon by a fan 33. The likewise cylindrical threshing and separating drum $25_4$, which is surrounded by the drum housing $23_4$, is set in motion by a drive 37. The threshing drum here rotates clockwise when seen from the front. Accordingly, the discharge point $35_4$ is situated at the rear end of the drum housing $23_4$ in the upper area thereof, as explained in the embodiment of FIGS. 3A and 3B.

The cylindrical drum housing $23_4$ with the coaxial threshing drum $25_4$ inside it is aligned with the drum axis 43 at an acute angle α relative to the longitudinal axis 45 of the combine harvester. In the front area of the drum housing facing the conveyor 9 is again provided an approximately tangential inlet $47_4$ that on the side facing the conveyor 9 ends in the drum housing $23_4$ above the drum axis. The tangential inlet $47_4$ is defined by a front sidewall $71_4$, which ends almost tangentially in the periphery of the drum housing $23_4$, and a rear sidewall $49_4$. Between the tangential inlet $47_4$ and the end of the conveyor 9 is disposed the inserting device $27_4$ comprised again of two conveyor rollers $81_4$ and $83_4$. The conveyor rollers $81_4$ and $83_4$ used here are similar to the conveyor rollers $81_3$ and $83_3$ according to the preceding embodiment. Each conveyor roller again comprises (see FIG. 4C) a cylinder jacket 85 on which grip plates $87_4$ are provided. Each conveyor roller has four grip plates distributed at 90° about the periphery thereof, said grip plates, similarly to the preceding embodiment, extending peripherally at 90° first in a screw thread $89_4$ until reaching the center of the cylinder jacket and then in a screw thread $91_4$ of opposite direction until reaching the other end of the conveyor roller. The passage between the two screw threads $89_4$ and $91_4$ of the grip plates is here continuous in an arch B, as illustrated in the detailed picture relative to FIG. 4B.

The two conveyor rollers rotate in opposite directions so that the first conveyor roller $81_4$ in FIG. 4A rotates counter-clockwise and the conveyor roller $83_4$ opposite to it rotates clockwise. The harvested product delivered by the conveyor 9 is thus enveloped by the conveyor roller $81_4$ aligned parallel with the forward end and is guided along a guide wall $97_4$ that here embraces said conveyor roller in direction toward the second conveyor roller $83_4$. The rotation axis of this second conveyor roller $83_4$ runs horizontally, but again is swung out opposite the rotation axis of the first conveyor roller $81_4$ in the direction of the drum axis 43. The front sidewall $71_4$ leads about the front area of this second conveyor roller facing the conveyor 9 and serves here as guide wall for the harvested product delivered by the first conveyor roller $81_4$. This harvested product is accordingly guided by this conveyor 9 in an S-line about the two conveyor rollers, and then is tangentially introduced in the drum housing $23_4$ between the two sidewalls $71_4$ and $49_4$. The threshed out harvested product is then ejected through the discharge point $35_4$ while the grain material accumulates in the collecting means 31 that feed it to the cleaning means 29. Like in the embodiments mentioned before, baffle plates $L_1$, $L_2$ are also attached here to the inner walls of the drum housing $23_4$.

Figure 5A:
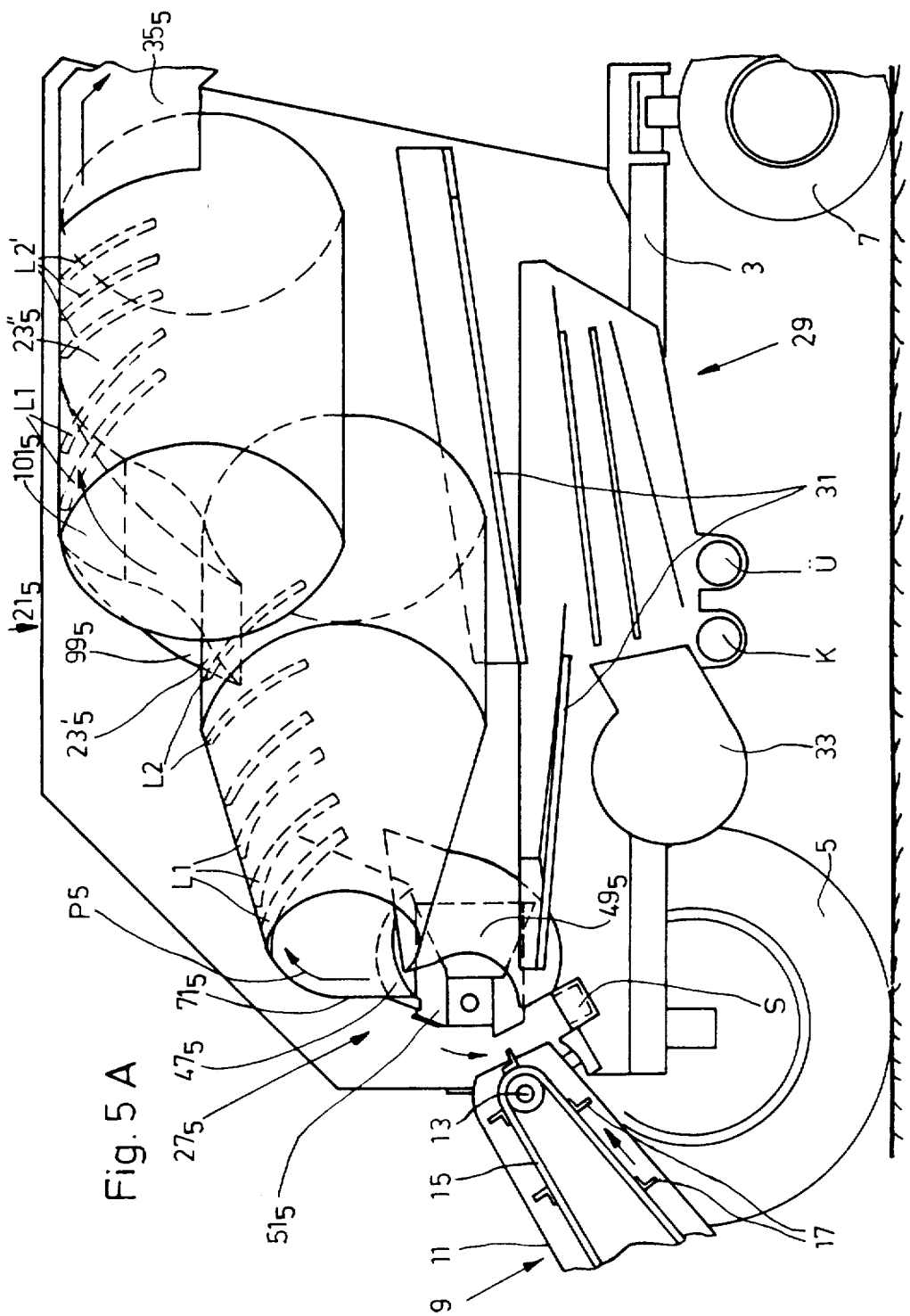

In FIGS. 5A and 5B is illustrated another embodiment of a combine harvester $1_5$. The combine harvester shown here again has a chassis 3, driving wheels 5, steering wheels 7, a conveyor in the form of an inclined elevator 9 with a housing 11, track wheels 13, a conveyor belt chain with carrier bars 17 and an axial thresher $21_5$. For the axial thresher $21_5$ there are provided a collecting means 31 and a cleaning means 29 with sieves and a fan 33 that acts upon the sieves. The thresher has in this case two drum housings $23_5'$ and $23_5''$ each with a threshing or separating drum $25_5'$ and $25_5''$ of relatively short construction. The first drum housing $53_5$ has a cylindrical housing portion $41_5'$ and a coaxial conic inlet portion $39_5$ attached toward the front. The axis 43 of this drum housing is adjusted at an acute angle α relative to the longitudinal axis 45 of the combine harvester, said angle being, on account of the short construction of this first drum housing $23_5'$, larger than the angle for the one piece drum housing in the above embodiments.

In the area of the conic inlet portion $39_5$ facing the conveyor 9 there is provided a tangential inlet $47_5$ defined by a rear sidewall or guide wall $49_5$ and a front sidewall $71_5$. Both sidewalls $49_5$ and $71_5$ end almost perpendicularly in the conic inlet portion $39_5$.

In the conveyor 9 and the tangential inlet $47_5$ into the drum housing is provided an inserting device $27_5$, which, similarly to the embodiment relative to FIGS. 2A and 2B, comprises only a truncated-pyramid conveyor $51_5$. The truncated-pyramid conveyor $51_5$ and the sidewalls $49_5$ and $71_5$ are constructed as described in the above mentioned embodiment. The harvested product delivered by the conveyor 9 is reoriented along the rear sidewall or guide wall $49_5$ by the truncated-pyramid conveyor $51_5$ that revolves counter-clockwies and is led to the tangential inlet $47_5$, and then introduced from above, along the sidewall $71_5$, into the conic inlet portion $39_5$ in the direction of the arrow $P_5$. Beneath the conveyor $51_5$ and behind the conveyor 9 is disposed a stone trap S that has a width approximately corresponding to that of the conveyor $51_5$ and retains the stones found in the flow of material.

When the harvested product has passed through the first drum housing $23_5'$ with the threshing drum $25_5'$, it is removed from the first drum housing at the end thereof through a tangential outlet $99_5$. This tangential outlet $99_5$ leads directly into a likewise approximately tangential inlet $101_5$ for the second drum housing $23_5''$ with the cylindrical threshing drum $23_5''$ therein. This second drum housing $23_5''$ is sidewise offset in respect to the first drum housing $23_5'$ and above it within the width of the vehicle, the drum axis $43''$ of said drum housing assuming in respect to the longitudinal axis 45 of the combine harvester an angle $\delta$ that in this case is equal to the angle of attack $\alpha$. The tangential outlet $99_5$ from the first drum housing $23_5'$ is above the drum axis 43; the tangential inlet $105_5$ discharges in said axis almost on the upper apex of the second threshing drum $23_5''$. The partly threshed harvested product that runs through the first drum housing $23_5'$ then runs through the second threshing drum $25_5''$ over the whole length thereof. The threshed out grain material of both threshing drums is collected in the collecting means 31 and fed to the cleaning means 29, while the threshed out harvested product is ejected through a discharge point $35_5$ tangentially situated in the upper area of the second drum housing at the end thereof. Guide elements $L_1$, $L_2$ and $L_1'$ and $L_2'$ are also attached here to the inner walls of the drum housing, the guide elements $L_1$ and $L_1'$ having a larger climbing angle $E_1$, $E_1'$ than the guide elemengs $L_2$ and $L_2'$ that respectively follow.

By such a tandem arrangement of the drum housings $23_5'$ and $23_5''$ positioned against the longitudinal axis 45 of the combine harvester, it is possible to increase the effective threshing path that the harvested product traverses and therewith the period of action of the threshing agents on the threshed product in comparison to a one piece threshing drum arrangement. This embodiment also ensures a smooth transfer of the harvested product delivered by the conveyor 9 into the threshing drum assembly and a smooth conveyance of the threshed product with the drum assembly. It is advantageous here to construct the first area $23_5'$ as threshing area and the second area $23_5''$ as separating area in order thus to make possible adequately to shape and adjust the areas individually. The threshing and separating rotor $25_5'$ and $25_5''$ is set in motion by the drive unit 37. The speeds can be different.

In the five embodiments shown it has been forgone, for reasons of clarity, to illustrate a grain tank to which is fed by means of feeding devices the grain material that penetrates the sieves of the cleaning means 29. In the views 1A to 5A has been illustrated only a collecting means K in the form of a collecting channel with a transverse worm wherein the cleaned grain is collected and fed to the grain tank by a feeding means not shown.

In another collecting channel U is collected the grain material carrying impurities that overflow the sieves of the cleaning means 29 and are returned, being again delivered to the cleaning means 29 by a sweeper not shown.

The inclined position of the threshing and separating device makes possible a better distribution of the separated flow of material on the surfaces of the sieves when using a horizontal sieve cleaning device known per se.

We claim:

1. A movable combine harvester with axial thresher including a mowing apparatus, a conveyor connected thereto for the cut harvest product, a rotating threshing and separating drum assembly defining an axis of rotation accommodated in a drum housing for axially threshing harvested product, and an inserting device for transferring the harvest product delivered by the conveyor into an inlet of said drum housing, wherein the rotation axis (43) of the threshing and separating drum assembly (25) is disposed in the horizontal plane at an acute angle to the longitudinal axis (45) of the combine harvester (1), the drum housing having at the forward end facing the conveyor (9), a tangential inlet ($47_1$) defined by a sidewall of the housing which serves as a guide wall ($49_1$), for the harvested crop extending to guide said crop from the conveyor (9), into said tangential inlet ($47_1$).

2. A combine harvester according to claim 1, wherein said tangential inlet ($47_1$) is situated on a sidewall of said drum housing remote from said conveyor (9).

3. A combine harvester according to claim 1, wherein said tangential inlet ($47_2$ to $47_5$) is situated on a sidewall of said drum housing facing said conveyor (9).

4. A combine harvester according to claim 1, wherein said tangential inlet ($47_1$) discharges into said drum housing (23) at approximately the height of said longitudinal axis (43) thereof.

5. A combine harvester according to claim 1, wherein said inserting device (27) has a conveyor ($51_1$, $51_2$, $51_5$) in the form of a four-sided truncated pyramid, which, as an extension of the pyramid surfaces carrier bars (57) for transferring the harvested product delivered by said conveyor (9) to said guide wall (49) of said tangential inlet (47), and said truncated-pyramid conveyor extends over the whole width of said conveyor and is driven about the pyramid axis (55) thereof.

6. A combine harvester according to claim 5, wherein said rotation axis (55) of said truncated-pyramid conveyor is adjusted in the horizontal line in the direction toward the course of said drum axis (43) of said drum housing (23) in a manner such that upon a rotation the respective carrier bar (57) of said truncated-pyramid conveyor (51) facing said conveyor (9) is parallel with the end surface of said conveyor (9).

7. A combine harvester according to claim 5, wherein said truncated-pyramid conveyor ($51_2$, $51_5$) is covered over the whole width on one side by said guide wall ($49_2$, $49_5$) reaching down said conveyor and on the other side by a sidewall ($71_2$, $71_5$) opposite said guide wall.

8. A combine harvester according to claim 7, wherein said guide wall and sidewall ($49_2$, $49_5$, $71_2$, $71_5$) conically approximate each other in the direction toward said tangential inlet ($47_2$, $47_5$).

9. A combine harvester according to claim 5, wherein in the area of the larger base surface of said truncated-pyramid conveyor ($51_1$) there is provided a screw wheel ($53_1$) with a rotation axis extending in vertical direction almost perpendicularly to the rotation axis (55) of said truncated-pyramid conveyor for transferring the harvest product delivered and reoriented in this area of said truncated-pyramid conveyor ($51_1$) in the direction toward said guide wall ($49_1$) of said tangential inlet ($47_1$).

10. A combine harvester according to claim 9, wherein vanes (61) of said screw wheel ($53_1$) have in their working range an approximately triangular configuration shaped as concave arches.

11. A combine harvester according to claim 1, wherein a pair of conveyor rollers ($81_3$, $83_3$; $81_1$, $83_4$) are provided as inserting device ($27_3$, $27_4$), a first of said pair of conveyor rollers ($81_3$, $81_5$) extending parallel with the broad side of said conveyor (9), a second of said pair of conveyor rollers ($83_3$, $83_5$) being situated above said first conveyor roller, and said second conveyor roller having a substantially horizontal rotation axis angled to said longitudinal axis (45) at less than said acute angle.

12. A combine harvester according to claim 11, wherein said conveyor rollers ($81_3$, $83_3$; $81_4$, $83_4$) are driven in different rotating directions.

13. A combine harvester according to claim 11, wherein said conveyor rollers ($81_3$, $83_3$, $81_4$, $83_4$) are surrounded by said sidewall ($49_3$, $97_3$, $71_3$; $49_4$, $97_4$, $71_4$) that starts from said tangential inlet ($47_3$, $47_4$).

14. A combine harvester according to claim 48, wherein said sidewalls ($49_3$, $71_3$; $49_4$, $71_4$) that surrounds said second roller ($83_3$, $83_4$) conically approximate each other in the direction of said tangential inlet ($47_3$, $47_4$).

15. A combine harvester according to claim 11, wherein said conveyor rollers ($81_3$, $83_3$; $81_4$, $83_4$) of said inserting device ($27_3$; $27_4$) are similarly constructed and have a cylinder jacket (85) provided with grip plates ($87_3$, $87_4$) that extend helically and stand approximately perpendicularly on the peripheral surface of said cylinder (85).

16. A combine harvester according to claim 15, wherein said grip plates ($87_3$, $87_4$), beginning from one side of said cylinder (85), run first, until reaching the center of said cylinder, in a first helical direction ($89_3$, $89_4$) and then, until reaching the other side of said first cylinder, in an opposite helical direction ($91_3$, $91_4$).

17. A combine harvester according to claim 16, wherein the spiral angle of the individual screw threads ($89_3$, $89_4$, $91_3$, $91_4$) of said grip plates ($87_3$, $87_4$) amounts to about 90°.

18. A combine harvester according to claim 16, wherein both screw threads ($89_3$, $91_3$) of said grip plates ($87_3$) meet in the middle of said cylinder (85) of said conveyor rollers ($81_3$, $83_3$) at an angle about 90 degrees.

19. A combine harvester according to claim 18, wherein said two screw theads ($89_3$, $91_3$) of said grip plates ($87_3$) are placed in the rotation direction of the respective conveyor roller ($81_3$, $83_3$).

20. A combine harvester according to claim 16, wherein said two screw threads ($89_4$, $91_4$) of said grip plates ($87_4$) of said two conveyor rollers ($81_4$, $83_4$) continuously change into each other in the center of said cylinder (85) and form a concave zone (B) in the rotation direction of the roller.

21. A combine harvester according to claim 1, wherein said drum housing ($23_1$, $23_2$, $23_3$, $23_5$) conically tapers running forwardly in the front area facing said conveyor (9) to form a conic inlet portion (39), and said tangential inlet ($47_1$, $47_2$, $47_3$, $47_5$) extends over the whole length of said conic inlet portion.

22. A combine harvester according to claim 26, wherein adjoining said conic inlet portion (39) said drum housing (23) is cylindrically constructed.

23. A combine harvester according to claim 21, wherein said conic inlet portion ($39_1$, $39_3$, $39_5$) and said cylindrical drum housing portion ($41_1$, $41_3'$, $41_5$) have a common axis (43).

24. A combine harvester according to claim 21, wherein within said drum housing ($23_1$, $23_3$, $23_5'$) rotates a coaxial threshing drum ($25_1$, $25_3$, $25_5'$) the outer contour of which is adapted to the contour of said drum housing.).

25. A combine harvester according to claim 21, wherein the axis (43') of said conic inlet portion ($39_2$) is pitched off in the horizontal line at an angle ($\beta$) relative to said axis (43) of said cylindrical drum housing portion ($41_2$) in a manner such that the angle between said axis of said conic inlet portion and the end of said conveyor (9) is reduced in relation to the angle between said axis (43) of said cylindrical drum housing portion ($41_2$) and the end of said conveyor.

26. A combine harvester according to claim 25, wherein there is disposed in said conic inlet portion ($39_2$) a likewise conically extending threshing drum ($25_2''$) that rotates about the axis (43') of said conic inlet portion.

27. A combine harvester according to claim 25, wherein said cylindrical threshing drum (25'') of said cylindrical drum housing portion ($41_2$) and the conic threshing drum ($25_2''$) of said conic inlet portion ($39_2$) are set in motion by a common drive (37) and the threshing drum axes are interconnected by a buckling joint (73).

28. A combine harvester according to claim 1, wherein said drum housing ($23_4$) is cylindrical and accommodates a likewise cylindrical threshing drum ($25_4$), and said tangential inlet ($47_4$) in the sidewall of said drum housing discharges into the forward area thereof.

29. A movable combine harvester with axial thresher including a mowing apparatus, a conveyor connected thereto for the cut harvest product, a rotating threshing and separating drum assembly defining an axis of rotation accommodated in a drum housing for axially threshing harvested product, and an inserting device for transferring the harvest product delivered by the conveyor into an inlet of said drum housing, wherein the rotation axis (43) of the threshing and separating drum assembly (25) is disposed in the horizontal plane at an acute angle to the longitudinal axis (45) of the combine harvester (1), the drum housing having at the forward end facing the conveyor (9), a tangential inlet ($47_1$) defined by a sidewall of the housing which serves as a guide wall ($49_1$), for the harvested crop, extending to guide said crop from the conveyor (9), into said tangential inlet ($47_1$), wherein there is provided a two-part drum housing ($23_5'$, $23_5''$) each accommodating a threshing drum ($25_5'$, $25_5''$), the axes of the drums being adjusted respectively relative to said longitudinal axis (45) of said combine harvester in the horizontal plane at acute angles, there being provided said tangential inlet ($47_5$) in a first said part of said two part drum housing and a discharge point at the end of a second said part of said two part drum housing, an outlet end ($99_5$) of said first said part of said drum housing ($23_5$) discharging in a tangential inlet ($101_5$) at the beginning of said second drum housing ($23_5''$).

30. A combine harvester according to claim 29, wherein said first part of said drum housing ($23_5'$) is constructed as threshing area and said second part ($23_5''$) as separating area.

31. A combine harvester according to claim 64, wherein of both drum axes (43, 43") are parallel.

32. A combine harvester according to claim 29, wherein said threshing and separating drums situated in said two drum housings (23$_5'$, 23$_5''$) are set in motion by a common drive (37).

33. A combine harvester according to claim 32, wherein said threshing and separating drums have different speeds.

34. A combine harvester according to claim 29, wherein said first drum housing (23$_5'$) is provided with a conic inlet portion (39$_5$) over the length of which the tangential inlet (47$_5'$) discharges.

35. A movable combine harvester with axial thresher including a mowing apparatus, a conveyor connected thereto for the cut harvest product, a rotating threshing and separating drum assembly defining an axis of rotation accommodated in a drum housing for axially threshing harvested product, and an inserting device for transferring the harvest product delivered by the conveyor into an inlet of said drum housing, wherein the rotation axis (43) of the threshing and separating drum assembly (25) is disposed in the horizontal plane at an acute angle to the longitudinal axis (45) of the combine harvester (1), the drum housing having at the forward end facing the conveyor (9), a tangential inlet (47$_1$) defined by a sidewall of the housing which serves as a guide wall (49$_1$), for the harvested crop, extending to guide said crop from the conveyor (9), into said tangential inlet (47$_1$), wherein said drum housing (23$_1$ to 23$_5$) is provided in its inner walls with helicoidially attached guide elements (L$_1$, L$_2$) that interact with the rotor (25$_1$ to 25$_5$) and are ascendingly disposed in the rotation direction of said rotor (25$_1$ to 25$_5$), the climbing angle ($\epsilon_1$) of said guide elements (L$_1$) that are in the area of said tangential inlet (47$_1$ to 47$_5$, 101$_5$) being larger than the climbing angle ($\epsilon_2$) of said guide elements (L$_2$) that follow.

* * * * *

UNITED STATES PATENT AND TRADEMARK OFFICE
CERTIFICATE OF CORRECTION

PATENT NO. : 4,497,327
DATED : February 5, 1985
INVENTOR(S) : Franz HUG, Franz JOHLER & Raimar FRANKE It is certified that error appears in the above-identified patent and that said Letters Patent are hereby corrected as shown below:

Claim 14, column 15, line 1, replace "48" with "13";

Claim 31, column 17, line 1, replace "64" with "29".

Signed and Sealed this

Sixteenth Day of July 1985

[SEAL]

Attest:

DONALD J. QUIGG

Attesting Officer    Acting Commissioner of Patents and Trademarks